United States Patent
Giusti et al.

(10) Patent No.: US 12,280,670 B2
(45) Date of Patent: Apr. 22, 2025

(54) DISPLAY ASSEMBLY, IN PARTICULAR FOR A MOTOR VEHICLE DASHBOARD, AND ASSEMBLING METHOD FOR ASSEMBLING SUCH AN ASSEMBLY

(71) Applicant: MARELLI EUROPE S.P.A., Corbetta (IT)

(72) Inventors: Ruggero Giusti, Corbetta (IT); Jerome Forest, Corbetta (IT); Mohamed Gammoune, Corbetta (IT); Mishra Navaneetham, Corbetta (IT)

(73) Assignee: MARELLI EUROPE S.P.A., Corbetta (IT)

( * ) Notice: Subject to any disclaimer, the term of this patent is extended or adjusted under 35 U.S.C. 154(b) by 145 days.

(21) Appl. No.: 18/168,714

(22) Filed: Feb. 14, 2023

(65) Prior Publication Data

US 2023/0256825 A1 Aug. 17, 2023

(30) Foreign Application Priority Data

Feb. 15, 2022 (IT) .......................... 102022000002774

(51) Int. Cl.
  *B60K 35/60* (2024.01)
  *B60K 35/50* (2024.01)
  *B60K 35/22* (2024.01)

(52) U.S. Cl.
  CPC .............. *B60K 35/60* (2024.01); *B60K 35/50* (2024.01); *B60K 35/22* (2024.01);
  (Continued)

(58) Field of Classification Search
  CPC ........ B60K 35/00; B60K 35/22; B60K 35/50; B60K 35/60; B60K 2360/42; B60K 2360/688; B60K 2360/691; B60K 2360/816; B60K 2360/96; B60Y 2400/92; B60Y 2410/10

See application file for complete search history.

(56) References Cited

U.S. PATENT DOCUMENTS 2,600,091 A * 6/1952 Becker .................... D06F 55/00
  24/571
4,652,969 A * 3/1987 Stegenga ................. H05K 5/00
  361/801

(Continued)

FOREIGN PATENT DOCUMENTS

JP  2018028503 A  2/2018
WO  2022005461 A1  1/2022

OTHER PUBLICATIONS

Search Report for Italian Patent Application No. 2022000022774 dated Sep. 7, 2022.

*Primary Examiner* — Michael B. Pierorazio
(74) *Attorney, Agent, or Firm* — Howard & Howard Attorneys PLLC

(57) ABSTRACT

A display assembly, in particular for a motor vehicle dashboard, is provided with a display having a rear surface, on which a carrier is arranged; the assembly is further provided with a rear covering element and with a main printed circuit board, which is coupled to the carrier by a centering system and is arranged between the carrier and the rear covering element; the latter is fixed to the carrier so as to hold the main printed circuit board in position; the carrier is fixed to the rear surface of the display by means of adhesive.

11 Claims, 5 Drawing Sheets

(52) U.S. Cl.
CPC .... *B60K 2360/42* (2024.01); *B60K 2360/816* (2024.01); *B60Y 2400/92* (2013.01); *B60Y 2410/10* (2013.01)

(56) References Cited

U.S. PATENT DOCUMENTS

| | | | | |
|---|---|---|---|---|
| 4,653,783 A * | 3/1987 | Steup | .................... | G11B 33/02 |
| 4,673,100 A * | 6/1987 | Reis | .................... | H05K 5/0013 |
| | | | | 292/87 |
| 4,759,466 A * | 7/1988 | Chase | .................. | H05K 9/0073 |
| | | | | 200/305 |
| 5,636,535 A * | 6/1997 | Shimada | ............ | E05B 73/0023 |
| | | | | 70/57.1 |
| 5,823,341 A * | 10/1998 | Nakasuji | ............ | E05B 73/0023 |
| 5,934,114 A * | 8/1999 | Weisburn | ............ | E05B 73/0023 |
| | | | | 70/57.1 |
| 6,567,360 B1 * | 5/2003 | Kagawa | ............... | G11B 33/124 |
| | | | | 720/647 |
| 6,856,517 B2 * | 2/2005 | Keating | ............... | H05K 5/0017 |
| | | | | 361/801 |
| 6,920,976 B2 * | 7/2005 | Sykes | ................ | G11B 33/0461 |
| | | | | 206/308.2 |
| 7,103,892 B2 * | 9/2006 | Law | .................... | G11B 33/022 |
| | | | | 720/600 |
| 7,363,645 B1 * | 4/2008 | Hendricks | .............. | H04N 7/173 |
| | | | | 375/E7.025 |
| D631,449 S * | 1/2011 | Ritter | .......................... | D14/125 |
| 7,944,690 B2 * | 5/2011 | Yamagiwa | ........... | H05K 5/0013 |
| | | | | 361/679.56 |
| 8,148,633 B2 * | 4/2012 | Hung | .................. | H04M 1/0252 |
| | | | | 174/559 |
| 2004/0264155 A1 * | 12/2004 | Soule | ..................... | G06F 1/182 |
| | | | | 361/818 |
| 2005/0227744 A1 * | 10/2005 | Chiang | .................. | H05K 9/006 |
| | | | | 455/575.8 |
| 2006/0215357 A1 * | 9/2006 | Green | ................. | G11B 33/1426 |
| | | | | 361/678 |
| 2009/0148638 A1 * | 6/2009 | Kishi | .................. | H05K 5/0013 |
| | | | | 428/35.7 |
| 2009/0190291 A1 * | 7/2009 | Yamagiwa | ........... | H05K 5/0013 |
| | | | | 361/679.01 |
| 2011/0115349 A1 * | 5/2011 | Dernier | ................ | H05K 5/0013 |
| | | | | 29/426.6 |
| 2012/0307455 A1 * | 12/2012 | Ritter | .................. | H01L 23/4006 |
| | | | | 361/720 |
| 2013/0347051 A1 * | 12/2013 | Bose | .................... | H04N 21/418 |
| | | | | 725/151 |
| 2018/0218654 A1 * | 8/2018 | Hashimoto | .......... | H05K 7/1417 |
| 2021/0202881 A1 * | 7/2021 | Kwon | .................... | H05K 1/147 |
| 2021/0354560 A1 * | 11/2021 | Matsuoka | ................ | G09F 9/00 |
| 2021/0362603 A1 * | 11/2021 | Choi | .................... | B60K 35/10 |
| 2022/0032772 A1 * | 2/2022 | Nomura | ................ | B60K 35/10 |

* cited by examiner

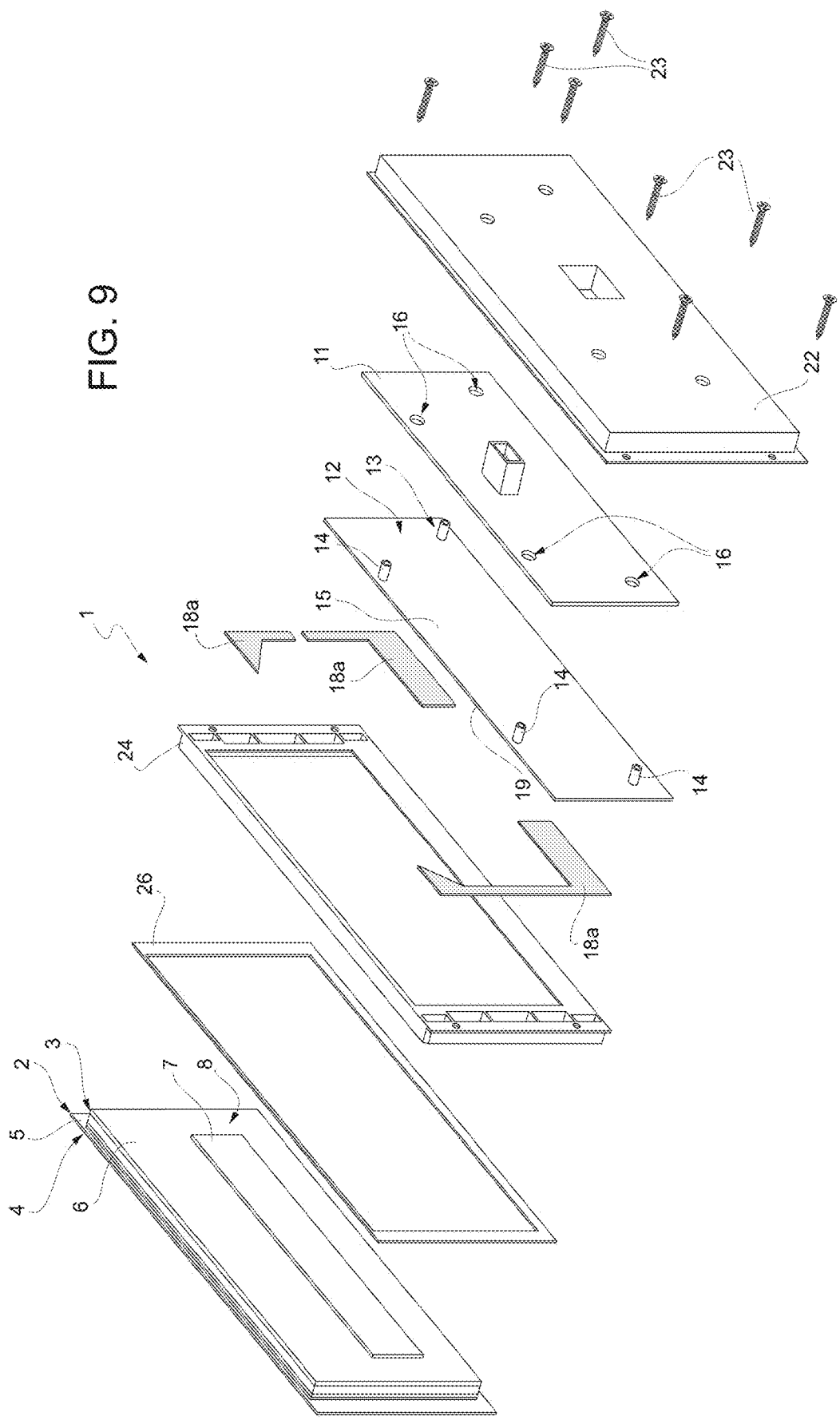

DISPLAY ASSEMBLY, IN PARTICULAR FOR A MOTOR VEHICLE DASHBOARD, AND ASSEMBLING METHOD FOR ASSEMBLING SUCH AN ASSEMBLY

CROSS-REFERENCE TO RELATED APPLICATIONS

This patent application claims priority from Italian patent application no. 102022000002774 filed on Feb. 15, 2022, the entire disclosure of which is incorporated herein by reference.

TECHNICAL FIELD

The invention relates to a display assembly, in particular for a motor vehicle dashboard, to which explicit reference will be made in the description below without, because of this, losing in generality.

BACKGROUND

As it is known, the dashboard of motor vehicles supports electronic accessories, such as displays and/or panels provided with control buttons. In case of displays, they must be coupled to a printed circuit board and to a rear covering element before being installed on the dashboard.

In particular, during assembling phases, the printed circuit board is placed on a carrier so as to take on a predefined reference position, whereas the carrier is placed on a rear surface of the display so that the carrier serves as a spacer and fulfils a centering action between the printed circuit board and the display. Then, the latter is connected to the printed circuit board through wires.

Subsequently, the rear covering element is placed on the printed circuit board, which, hence, is interposed between the rear covering element and the carrier.

The rear covering element can be fixed, by means of glue or double-sided adhesive tape, to the peripheral portion of a front glass, which, in turn, is placed in front of the display, so that it cannot be removed after the installation, or it can directly be fixed to the rear structure of the display itself, if the tolerance chain is relatively small (in the range of one tenth of millimeter).

Furthermore, regardless of the fixing to the display, the rear covering element is also fixed, by means of screws, to the carrier so as to hold the printed circuit board locked in a fixed position between these two elements.

At this point, one or more bracket elements can be fixed to the rear covering element in order to install the display assembly on the dashboard.

Known solutions of the type discussed above need to be improved, in particular in order to obtain a more precise and more stable support of the display and/or a better stiffness of the assembled display assembly, so as to preserve the TFT cell of the display from stresses and, preferably, so that the rear covering element can be removed from the display in order to inspect the printed circuit board even after the installation.

SUMMARY

Aim of the invention is to provide a display assembly, in particular for a motor vehicle dashboard, which fulfils the needs discussed above in a simple and economic manner.

According to the invention, there are provided a display assembly and a method for assembling such a display assembly, as defined in the appended claims.

BRIEF DESCRIPTION OF THE DRAWINGS

The invention will be best understood upon perusal of the following detailed description of a preferred embodiment, which is provided by mere way of non-limiting example, with reference to the accompanying drawings, in which:

FIG. 9 is similar to FIG. 1 and shows a variant of the display assembly.

DESCRIPTION OF EMBODIMENTS

Figure 1:
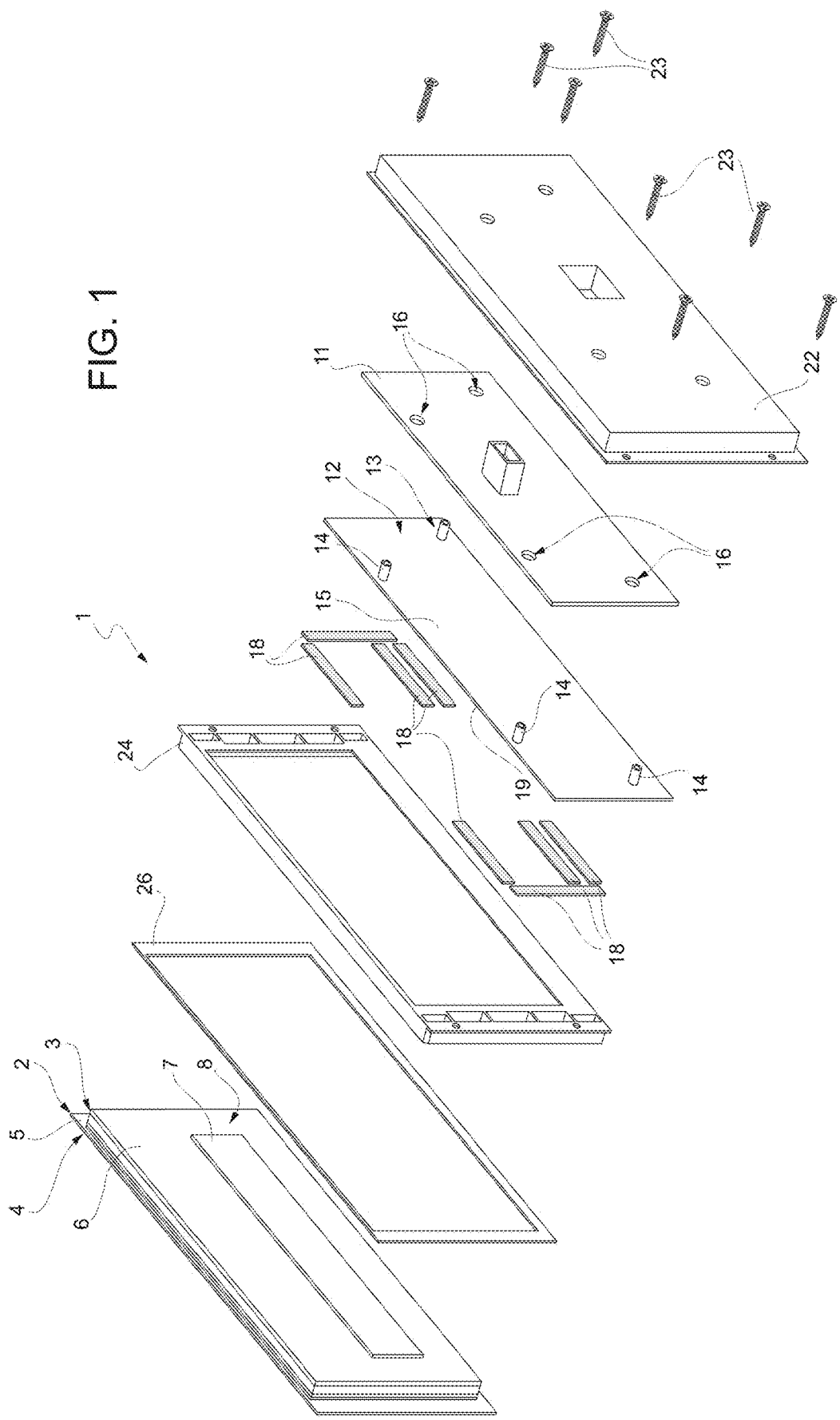
FIG. 1 is a schematic and exploded perspective view of a preferred embodiment of the display assembly, in particular for a motor vehicle dashboard, according to the present invention.

In FIG. 1, reference number 1 indicates a display assembly, which is suitable to be mounted on a motor vehicle dashboard (not shown) and comprises a pre-assembled module 2 comprising a display 3 and a covering glass 4, arranged in front of the display 3 in a fixed position. The covering glass 4 preferably has a peripheral portion 5, which extends around the display 3 and laterally projects outwards relative to the display 3 itself, so as to define a coupling flange.

The display 3 comprises a TFT panel, or TFT cell, which is a component that is particularly sensitive to stresses, and a lighting unit 6, which has a rear outer structure that can be used for the connection to other elements. The TFT cell has a printed circuit board 7, which is designed to control the video signal and, in some cases, to control the LEDs of the unit 6, is arranged in the area of a rear surface 8 of the unit 6 and is electrically and mechanically connected thereto in a way that is not described in detail.

According to variants that are not shown herein, the printed circuit board 7 can be arranged in other positions, so that the entire rear surface 8 of the unit 6 can be used for other purposes (among which there is a connection and support purpose, according to the provisions of the present invention, as described more in detail below).

The display assembly 1 further comprises a main printed circuit board 11, which is centred (namely, arranged in a predefined reference position) relative to the rear surface 8 through the interposition of a carrier 12, which serves as a support and fulfils a centering/positioning function for the main printed circuit board 11, like in known solutions. In addition, according to the invention and as better described below, the carrier 12 is connected to the surface 8 by means of an adhesive, namely is glued to it, preferably using materials with suitable densities, established during the design phase, in order to make up for the tolerance chain without generating stresses upon the sensitive component defined by the TFT cell.

In particular, the main printed circuit board 11 is positioned in relation to the carrier 12 by means of a coupling and centering system 13 having features that are such as to support the main printed circuit board 11 without the latter being firmly fixed to the carrier 12, and such as to make up for positioning tolerances during the assembling phases. In the specific example shown herein, the system 13 comprises a plurality of pins 14, which project at the back from a plate 15 of the carrier 12 so as to engage, with a clearance, respective through holes 16 made in the main printed circuit board 11. In particular, the pins 14 are provided with respective threaded holes.

According to the invention, as mentioned above, the carrier 12 is fixed, at the front, to the rear surface 8 of the display 3 by means of one or more adhesive elements 18, defined by a slow-polymerization glue or, preferably, by double-sided adhesive tapes or pads with a thickness and a density that are such as to make up for the tolerance chain during the assembling operations. More in detail, the plate has a front surface 19 comprising an area facing the printed circuit board 7 and a preferably flat and relatively large area, which is arranged beside and/or around the printed circuit board 7, hence faces the rear surface 8 and is fixed to the latter by means of the adhesive elements 18.

Figure 4:
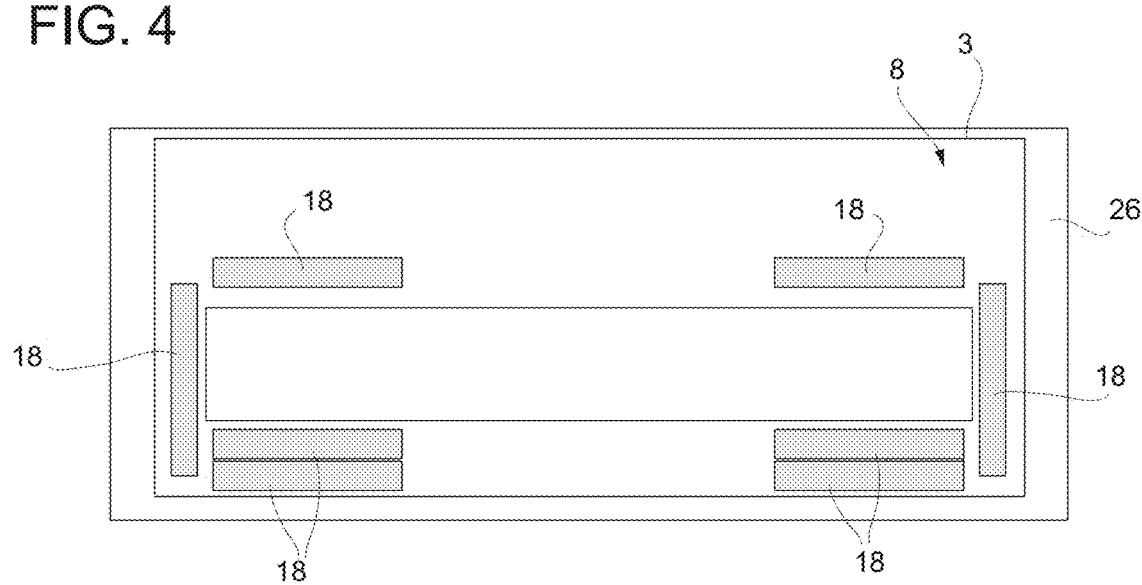
Figure 5:
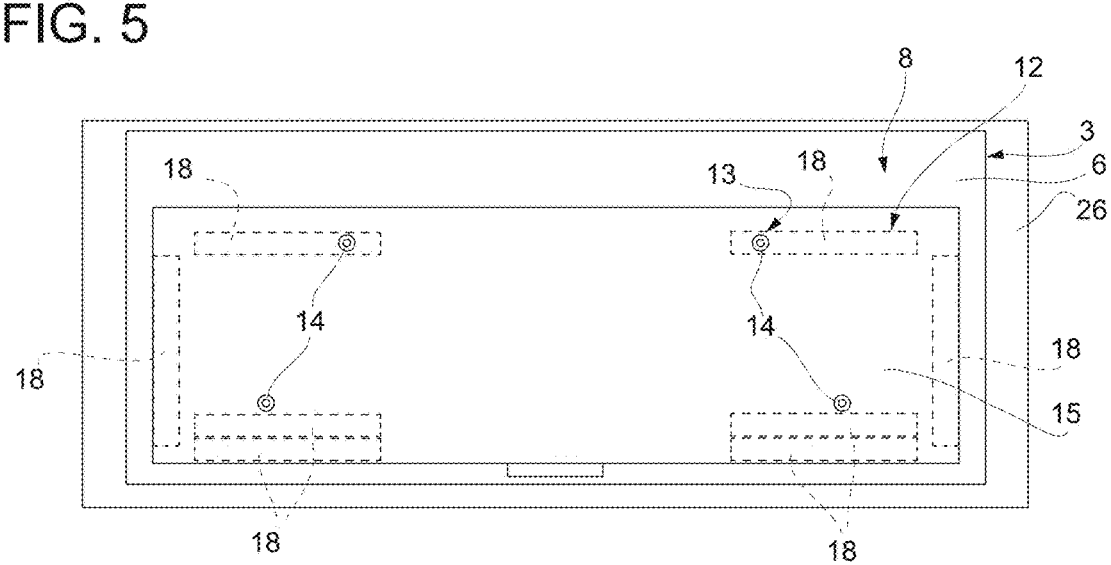
Figure 6:
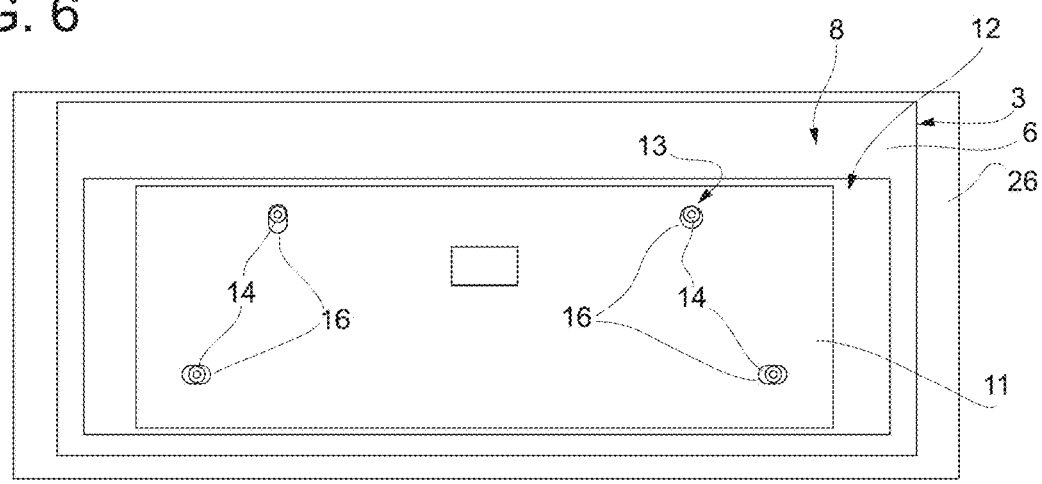
Figure 7:
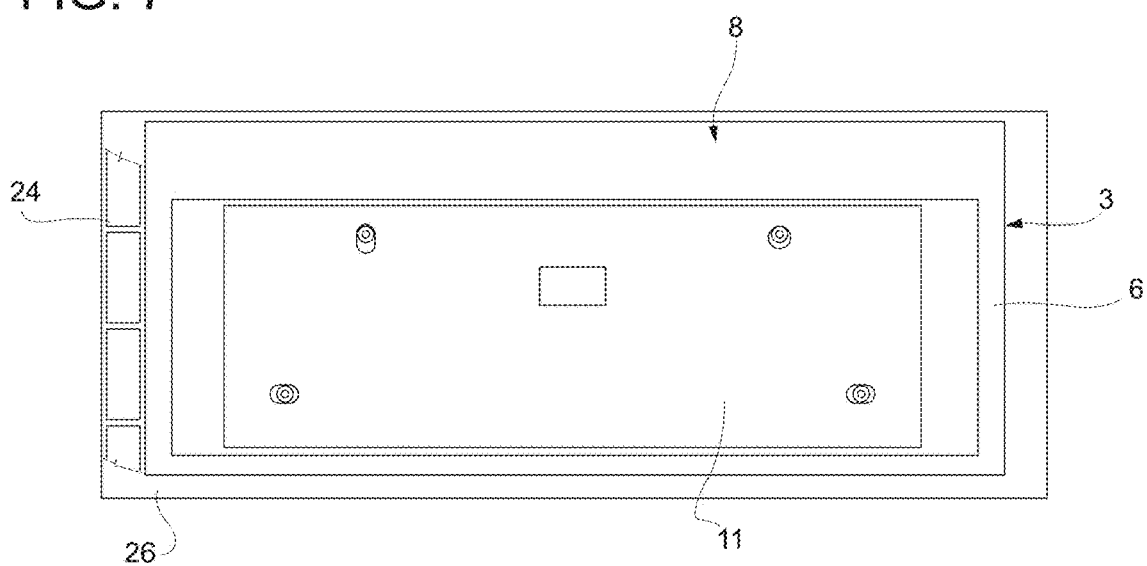

By way of example, as shown in FIG. 4, the adhesive elements 18 are arranged along all the four sides of the printed circuit board 7; more in detail, the adhesive elements 18 are defined by a plurality of adhesive strips. The number and the shape of the adhesive elements 18 can be defined based on cost, design and process factors and must be adapted to the features of the supplied module 2.

Furthermore, as mentioned above, the printed circuit board 7 can be arranged elsewhere (or even be integrated in the main printed circuit board 11) so as to leave a greater area available for the adhesion between the surface 8 of the display 3 and the plate 15.

With reference to FIG. 1, again, the main printed circuit board 11 is electrically connected (by means of connectors that are not shown herein) to the printed circuit board 7 and is interposed between the carrier 12 and a rear covering element 22. The latter is fixed to the carrier 12 so as to hold the main printed circuit board 11 in a fixed position between the elements 12 and 22. The fixing preferably is releasable. Said releasable fixing, for example, is defined by a plurality of screws 23, which, in particular, are screwed into the threaded holes of the pins 14.

According to a preferred aspect of the invention, the rear covering element 22 is fixed to the module 2 in a releasable manner, preferably through the interposition of a frame 24, which is defined by a piece that is separate from, and independent of, the carrier 12 and, in particular, has an annular shape so as to surround the display 3. More in particular, the frame 24 is interposed between the rear covering element 22 and the portion 5 and is fixed to the latter by means of one or more adhesive elements 26, which are distinct from the adhesive elements 18 and are defined by glue or, preferably, double-sided adhesive pads, whereas the rear covering element 22 is fixed to the frame 24, preferably in a releasable manner, for example by means of screws 27 arranged along the entire perimeter of the frame 24.

In the specific example shown herein, there is one single adhesive element 26 with an annular shape, basically corresponding to the shape and to the area of the rear surface of the portion 5.

According to a variant which is not shown herein, one or more thermal elements (made of a heat conductor material and normally indicated as "thermal pads" or "thermal gel") can be interposed between the unit 6 and the rear covering element 22 in order to remove heat from some areas that get heated up to a greater extent due the power supply of the unit 6. These thermal elements are sized and/or arranged so as to avoid stresses that could jeopardize the sensitive components of the display 3.

Figure 2:
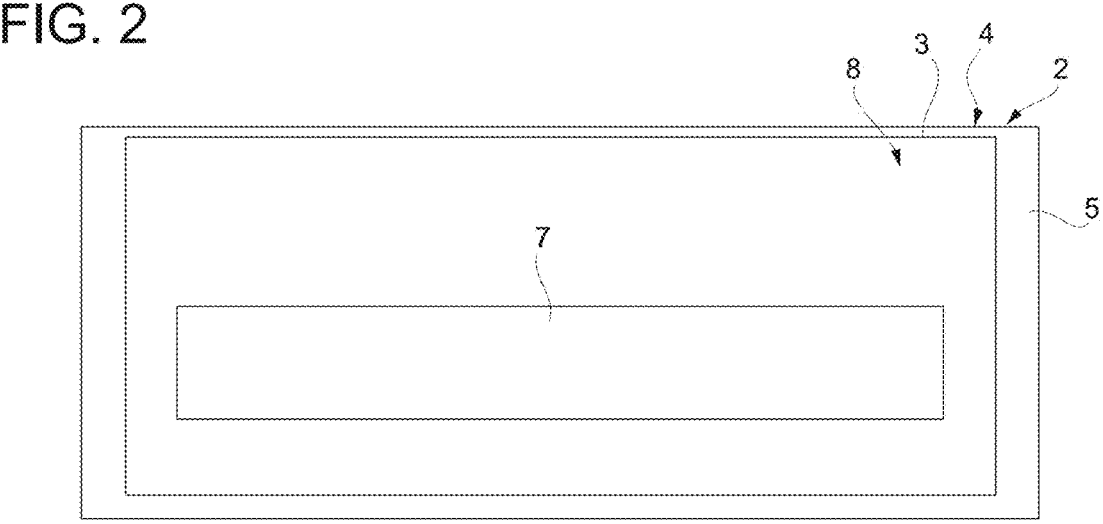
FIGS. 2 to 7 are rear views showing, in a simplified manner, a sequence of steps for assembling the display assembly of FIG. 1.
Figure 3:
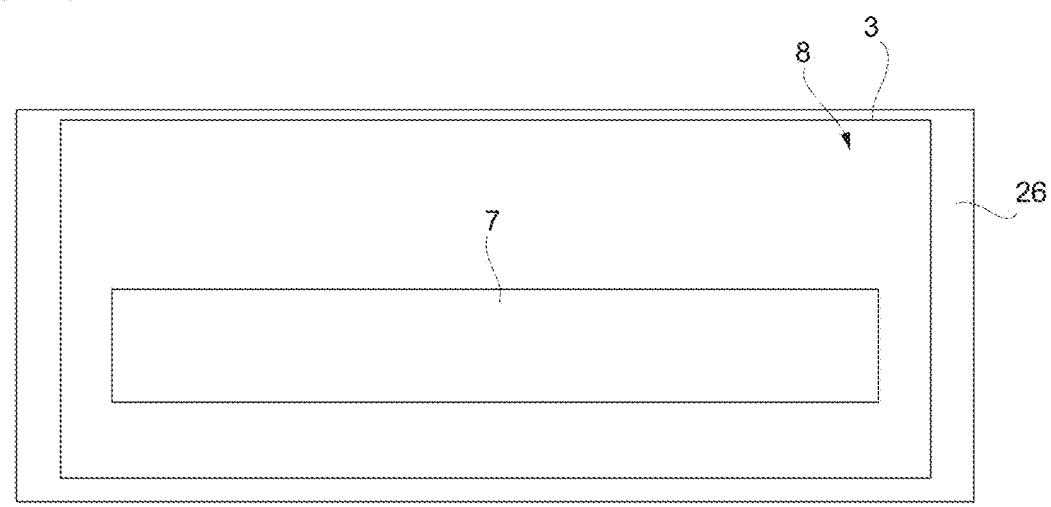
Figure 8:
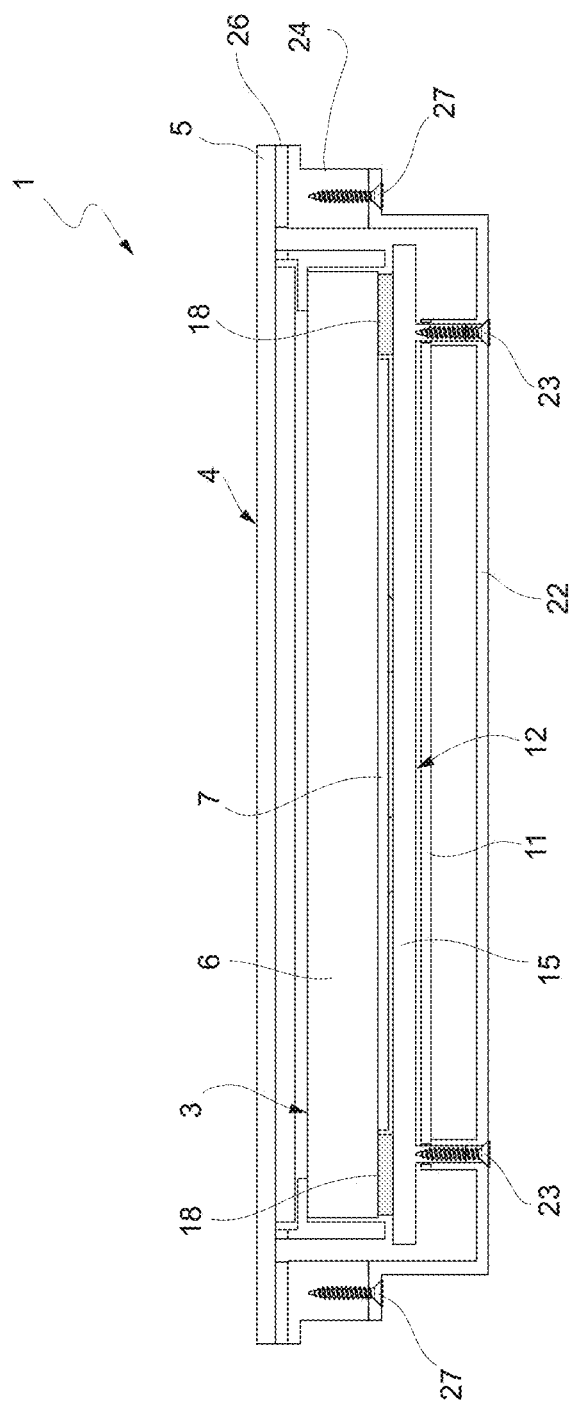
FIG. 8 schematically shows, in cross section, the display assembly at the end of the assembling.

With reference to FIGS. 2 to 8, the display assembly 1 is assembled by following the below steps (considered one after the other), based on a preferred embodiment:

the module 2, provided by a supplier, a warehouse or a pre-assembling station, reaches an assembling station, where the module is preferably placed on a work surface, with the covering glass 4 (with a possible protection film) facing downwards and with the rear surface 8 facing upwards (FIG. 2);

the adhesive element 26 is applied onto the rear surface of the portion 5 (as shown in FIG. 3) or onto the frame 24; the application onto the frame 24 could be easier, since the application onto the surface 5 could be difficult due to the presence of the display 3;

as mentioned above, it is advisable the adhesive elements 26 be defined by a double-sided adhesive tape or pad having two protection films (not shown), one of them being removed to reveal an adhesive face, which is attached to the portion 5 (or to the frame 24);

the adhesive elements 18 are applied onto the rear surface 8 around the printed circuit board 7 (FIG. 4); alternatively, the adhesive elements 18 can be applied onto the front surface 19 of the plate 15;

as mentioned above, the adhesive elements 18 should be defined by double-sided adhesive pads having, each two protection films (not shown), one of them being removed to reveal an adhesive face, which is attached to the rear surface 8 (or to the plate 15);

the carrier 12 is placed behind the display 3 (FIG. 5) and is coupled to the latter by means of the adhesive elements 18; if they are defined by double-sided adhesive pads, at first the protection film is removed in order to reveal the adhesive face needed for the adhesion;

the carrier 12 is preferably pressed towards the module 2 in order to cause them to adhere;

a centering system, which is not shown, could be provided on the rear surface 8 and/or on the plate 15 so as to unmistakably define the relative position between the carrier 12 and the module 2 during the approaching and/or the laying of the plate 15;

the main printed circuit board 11 is placed on the carrier 12 and coupled by means of the system 13, namely by means of the pins 14 (FIG. 6); then, it is electrically connected to the display 3 in a way that is not shown herein;

the frame 24 is fitted around the display 3 and is fixed to the portion 5 through the adhesive element 26 (FIG. 7); if the latter is a double-sides adhesive tape of pad, at first the protection film must be removed in order to reveal the adhesive face needed for the adhesion;

the frame 24 is preferably pressed towards the portion 5 in order to cause them to adhere;

the rear covering element 22 is placed behind the main printed circuit board 11 and the frame 24 and is fixed, in a releasable manner, to the carrier 12 by screwing the screws 23, and to the frame 24 by screwing the screws 27 (FIG. 8).

According to variants that are not shown herein, the assembling process can be carried out in different ways, for instance:

the carrier 12 is glued to the rear surface 8 of the display 3 and the main printed circuit board 11 is placed on the carrier 12 and is electrically connected to the display 3, like in the previous example;

in this case, however, according to a preferred embodiment of the invention, the adhesive element 26 is applied onto the frame 24 after or during a pre-assembling step, which entails fixing the frame 24 to the rear covering element 22, by means of the peripheral screws 27, so as to form a sub-assembly;

this sub-assembly (formed by the components 22, 24, 27 and preferably also 26) is then placed behind the main printed circuit board 11 and is coupled to the portion 5 by means of the adhesive element 26; in this way, stresses and small deformations caused by the screwing of the screws 27 remain confined in the sub-assembly and are not transferred to the covering glass 4, thus preserving the sensitive components inside the display 3; in other words, the stresses caused by the screwing action are prevented from being transferred to the covering glass 9; the screws 27 of the aforesaid sub-assembly allow anyway the rear covering element 22 to be disassembled and removed;

finally, the aforesaid sub-assembly is fixed to the carrier 12 by means of the screws 23; the adhesive elements 18, which are already provided, have the function of favoring the settling of the assembly 1, by absorbing stresses and small deformations caused by the screwing of the screws 23;

when it reaches the assembling station, the module 2 can already include double-sided adhesive tapes or pads on the rear surface 8 of the display 3 and/or on the portion 5;

when it reaches the assembling station, the module 2 can already include the frame 24 attached to the portion 5;

when it reaches the assembling station, the module 2 can already include the carrier 12 attached to the rear surface 8 of the display 3;

the carrier 12 and the main printed circuit board 11 can be pre-mounted on the rear covering element 22 through the screws 23, so as to form a sub-assembly, which is afterwards coupled, through adhesive, to the rear surface 8 of the module 2 (in this case, the electrical connection between the main printed circuit board 11 and the printed circuit board 7 must be obtained by means of a so-called "board-to-board" connection).

Furthermore, based on the example of the variant of FIG. 9, the adhesive elements 18 can be replaced by adhesive elements 18a with different shapes and/or quantities and/or dimensions. Or, as already mentioned above, the adhesive elements 18,26 could be defined by a viscous slow-polymerization glue, which reaches its maximum consistency when the assembly 1 is already assembled, so as to avoid the transmission of stresses during the step that requires the screwing of the screws 23,27.

Furthermore, according to variants that are not shown herein, the screws 23 and/or the screws 27 could be replaced by different connection elements, which are anyway of the releasable kind, namely which allow anyway the rear covering element 22 to be disassembled and removed even after the installation (if necessary, by means of suitable tools or apparatuses), so that the main printed circuit board 11 can be inspected and, if necessary, replaced.

For instance, the screws 23 could be replaced by pins, which are part of the carrier 12 and project from the plate in order to be inserted into respective through seats obtained through the rear covering element 22; said pins can be fixed to the rear covering element 22 through interference (obtained, for example, by forcing the rear covering element 22 onto said pins) and/or through plastic deformation (for example, through riveting or crushing of the ends of the pins, behind the rear covering element 22) and/or through the coupling of clips or nuts at the ends of the pins, behind the rear covering element 22.

The screws 27, on the other hand, could be replaced, for example, by clips or elastically deformable portions of the rear covering element 22, which are coupled to the frame 24 in a snapping manner (so as to ensure anyway the necessary sturdiness of the assembly 1), especially in the case described above, in which a sub-assembly is prepared, which is provided with the rear covering element 22 and with the frame 24, and is subsequently connected to the portion 5 by means of adhesive.

The features of the assembly 1 and of the assembling method described above with reference to the accompanying drawings clearly reveal the advantages of this technical solution.

First of all, the carrier 12 takes on a larger number of functions compared to known solutions, where it only fulfilled a centering function and a supporting function for the main printed circuit board. As a matter of fact, the carrier 12 now also supports the unit 6 and, therefore, the entire module 2 thanks to the adhesive elements 18, which fix the carrier 12 to the rear surface 8.

At the same time, the adhesive elements 18 and/or 26, while fulfilling the supporting and connecting function, are able to avoid tensions and stresses for the module 2, in particular during the fixing steps, when the screws 23 and 27 are screwed, especially if the adhesive elements are defined by double-sided adhesive tapes or pads, which generally comprise a low-density or foam-like material, which naturally has damping properties, between their two adhesive faces. Furthermore, said material (or even the sole glue, with polymerization times that are slower than the cycle time, namely slower than the time needed to assemble the assembly 1) can absorb thermal stresses and make up for possible positioning tolerances, especially where the parallelism of the components cannot perfectly be ensured during the assembling. The density, the deformability, the damping, the thickness as well as other similar features of material supporting the double-sided adhesive can be selected and adjusted during the designing phase so as to optimize the assembling and/or the final quality of the product. For example, as mentioned above, said material can be designed so as to absorb the return forces of the carrier 12 towards the rear covering element 22 during the fastening of the screws 27, in order to avoid stresses to the covering glass 4, thus limiting the risk for cracks; for example, a double-sided adhesive tape or pad can be chosen, which has a foam material having a nominal thickness of 1.5 mm and capable of being compressed by circa 0.5 mm in the area of the carrier 12.

The same stress compensation function is carried out by the adhesive element 26 between the frame 24 and the module 2.

According to a preferred embodiment, which is described more in detail above, an ideal result in reducing the stresses of the display 3 is reached when the components 22 and 24 are pre-assembled (for example, by means of the screws 27) to form a sub-assembly, which is subsequently coupled to the module 2 by means of adhesive, since the stresses and the small deformations caused by the screwing of the screws 27 remain confined in said sub-assembly and do not reach the module 2.

As mentioned above, in order to the define the adhesive element 18 or in order to define the adhesive element 26, it is possible to use a layer of glue (having, for example, relatively slow polymerization times), instead of using double-sided adhesives, even though to the detriment of the advantages in terms of damping and compensation of those tolerances due to operating thermal shocks. However, the advantages in terms of absorption of the assembling tolerances are preserved, with the addition of an advantage in terms of general rigidity of the assembly 1.

Generally speaking, thicknesses should be as small as possible so as to avoid excessively increasing the size of the assembly 1 in a direction orthogonal to the rear surface 8 as well as the distance of the carrier 12 from the display 3. To this regard, for example, the carrier 12 could be designed so as to have a housing for the adhesive elements 18, so as to bring the remaining part of the carrier 12 closer to the display 3. This possibility of changing the distance between the components during the designing phase allows the behaviour of the assembly 1 to be changed in order to comply with requirements relating to head strikes (for example, according to the FMVSS201 standard or the ECE R21 regulation), thus making the assembly 1 more or less reactive to the absorption or to the transfer of the energy arising from the impact.

The plate-like conformation of the carrier 12 increases anti-intrusion properties during crash or accident events (tested, for example, according to the ECE R21 regulation or the FMVSS201 standard) and increases the overall sturdiness of the entire assembly 1. For example, thanks to the increase in sturdiness and to the fixing between the plate 15 and the display 3, the pile of components of the assembly 1 transmits the stresses caused by the crash in a basically instantaneous manner and these stresses are promptly released to programmed collapsing elements, which are provided, by design, on the dashboard in order to absorb crashes, with a consequent smaller risk of deformation and damaging of the covering glass 4.

In particular, aside from the flat character of the front surface 19 in those area where the adhesive elements 18 must be applied, the shape and/or the structure and/or the dimensions of the carrier 12 can be designed so as to fulfil the desired rigidity requirements. At the same time, the carrier 12 can be designed to as to have a relatively large adhesion surface for the fixing of the rear surface 8 of the display 3, with consequent advantages in terms of passing of vibration and crash tests.

For example, the dimensions of the rectangular perimeter of the carrier 12 can be set so as to be larger than one ones of the main printed circuit board 11.

Furthermore, the carrier 12 can be made of a relatively rigid plastic material, if necessary with a honeycomb structure or equivalent structures to increase the sturdiness thereof, or of a metal material obtained, for instance, through casting.

Furthermore, additional parts can be provided on the carrier 12, for example parts projecting from the plate 15, which serve as spacers, based on design requirements.

In order to allow for a better ventilation and, hence, limit temperature jumps, the shape and the position of the adhesive elements 18 can be established during the designing phase so as to define channels or empty spaces between the adhesive elements 18 themselves, which ensure an air flow that touches the surfaces 19 and 8.

Moreover, it is evident that the main printed circuit board 11 can be inspected, checked and, if necessary, replaced even after having installed the assembly 1 on the dashboard, thanks to the fact that the rear covering element 22 is fixed to the other components in a releasable manner (in particular, through the screws 23 and 27) and, hence, can be removed in a relatively easy manner.

Finally, the assembly station can be set up in a relatively simple fashion, for example to feed the adhesive elements 18 and/or 26 towards the assembling station so as to make their application onto the components of the assembly 1 easier and, if possible, automated. To this regard, the front surface 19 of the carrier 12 should be perfectly flat.

Finally, owing to the above, it is evident that the assembly 1 described and shown herein can be subjected to changes and variations that do not go beyond the scope of protection of the invention, as set forth in the appended claims.

For example, the adhesive elements 18 can comprise a combination of double-sided adhesives and slow-polymerization glue layers, based on the type, the shape and the arrangement of the areas of the surfaces 8 and 19 to be glued to one another.

Furthermore, the general concept of coupling the carrier 12 to the rear surface 8 of the display 3 through adhesive can also be applied to more traditional solutions, in which the rear covering element 22 is fixed to the module 2 without frame 24.

Finally, the display assembly 1 according to the invention can be used in different solutions than the ones provided on the control panel of the driver. Generally speaking, in case of automotive applications in the passenger compartment, some examples are represented by: on-board panels, central displays/monitors, passenger's displays/monitors, air conditioning displays/monitors, rear passengers' displays/monitors (typically located on the front seats), rear-view displays/monitors (replacing and/or in addition to rear-view mirrors), head-up displays/monitors.

The invention claimed is:

1. A display assembly comprising:
a display having a rear surface;
a carrier, which is arranged behind said rear surface;
a rear covering element disposed behind said carrier, so that said carrier is arranged between said rear surface and said rear covering element;
a main printed circuit board, which is coupled to said carrier by a centering system and is arranged between said carrier and said rear covering element;
first connection elements, which fix said rear covering element to said carrier so as to block the main printed circuit board between said rear covering element and said carrier;
second connection elements, which are distinct from said first connection elements and are designed to cause said rear covering element to be fixed relative to said display;
wherein the display assembly further comprises at least one first adhesive element, which fixes said carrier to said rear surface.

2. The assembly according to claim 1, wherein said first adhesive element is defined by a double-sided adhesive tape or pad.

3. The assembly according to claim 1, wherein said carrier comprises a plate, which is fixed to said rear surface by said first adhesive element.

4. The assembly according to claim 1, wherein said display comprises a secondary printed circuit board, which is arranged at said rear surface, and wherein said carrier is fixed to said rear surface by a plurality of first adhesive elements, which are arranged around said secondary printed circuit board.

5. The assembly according to claim 1, wherein said first connection elements and second connection elements define respective releasable couplings and, preferably, are screws.

6. The assembly according to claim 1, wherein the assembly further comprises:

a frame defined by a piece, which is separate from said rear covering element and is fixed to said rear covering element by said second connection elements;

a covering glass, which is arranged in a fixed position in front of said display and comprises a peripheral portion, which projects outwards relative to said display;

at least one second adhesive element, which fixes said frame to said peripheral portion.

7. The assembly according to claim 6, wherein said second adhesive element is defined by a double-sided adhesive tape or pad.

8. An assembling method for assembling a display assembly includes a display having a rear surface; a carrier; a main printed circuit board; and a rear covering element;

the method comprising the steps of:

placing said main printed circuit board on said carrier in a predefined reference position;

placing said rear covering element on said main printed circuit board and behind said carrier, after having placed the main printed circuit board on the carrier, so that the main printed circuit board is disposed between said rear covering element and said carrier;

fixing said rear covering element to said carrier so as to block the main printed circuit board between said rear covering element and said carrier;

fixing said rear covering element relative to said display so that said carrier is disposed between said rear surface and said rear covering element;

wherein the method comprises the step of fixing said carrier to said rear surface by adhesive before fixing said rear covering element relative to said display.

9. The method according to claim 8, wherein the rear covering element is fixed in a releasable manner, in particular by screws.

10. The method according to claim 8, wherein the step of fixing the rear covering element relative to the display comprises the operations of:

fixing a frame, by adhesive, to a peripheral portion of a covering glass, which is arranged in a fixed position in front of said display;

fixing the rear covering element to the frame.

11. The method according to claim 10, wherein the rear covering element is fixed to said frame so as to form a sub-assembly, before fixing said frame to said peripheral portion by adhesive.

\* \* \* \* \*